(12) United States Patent
Goings (10) Patent No.: US 12,316,625 B1
(45) Date of Patent: May 27, 2025

(54) ONLINE SECURITY CENTER

(71) Applicant: United Services Automobile Association (USAA), San Antonio, TX (US)

(72) Inventor: James Neil Goings, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/436,242

(22) Filed: Feb. 8, 2024

Related U.S. Application Data (63) Continuation of application No. 17/164,478, filed on Feb. 1, 2021, now Pat. No. 11,902,272, which is a continuation of application No. 15/433,689, filed on Feb. 15, 2017, now Pat. No. 10,917,400.

(60) Provisional application No. 62/297,288, filed on Feb. 19, 2016.

(51) Int. Cl.
| | | |
|---|---|---|
| *H04L 9/40* | (2022.01) | |
| *G06F 3/0482* | (2013.01) | |
| *G06F 40/134* | (2020.01) | |

(52) U.S. Cl.
CPC .......... *H04L 63/083* (2013.01); *G06F 3/0482* (2013.01); *G06F 40/134* (2020.01); *H04L 63/1433* (2013.01); *H04L 63/20* (2013.01)

(58) Field of Classification Search
CPC ... H04L 63/083; H04L 63/1433; H04L 63/20; G06F 3/0482; G06F 40/134
See application file for complete search history.

(56) References Cited

U.S. PATENT DOCUMENTS

| | | |
|---|---|---|
| 6,487,552 B1 | 11/2002 | Lei |
| 7,346,923 B2 | 3/2008 | Atkins |
| 7,685,194 B2 | 3/2010 | Kabra |
| 8,261,330 B2 | 9/2012 | Atkins |
| 8,875,261 B2 | 10/2014 | Delia |
| 8,930,714 B2 | 1/2015 | Glew |
| 8,955,035 B2 | 2/2015 | Belinkiy |
| 9,069,979 B2 | 6/2015 | Srinivasan |
| 9,098,675 B1 | 8/2015 | Roth |
| 2005/0216465 A1 | 9/2005 | Dutta |
| 2005/0246338 A1 | 11/2005 | Bird |
| 2006/0224742 A1 | 10/2006 | Shahbazi |
| 2007/0250920 A1* | 10/2007 | Lindsay ............... G06F 21/31 726/7 |
| 2008/0022379 A1 | 1/2008 | Wray |
| 2008/0168539 A1 | 7/2008 | Stein |
| 2011/0092185 A1 | 4/2011 | Garskof |
| 2012/0008769 A1 | 1/2012 | Collins |
| 2012/0272301 A1 | 10/2012 | LoBean |
| 2012/0324237 A1 | 12/2012 | D'Souza |
| 2013/0262311 A1 | 10/2013 | Buhrmann |
| 2014/0052749 A1 | 2/2014 | Rissanen |
| 2014/0075512 A1* | 3/2014 | Vargas .................. G06F 21/31 726/4 |

(Continued)

*Primary Examiner* — Abiy Getachew
(74) *Attorney, Agent, or Firm* — Fletcher Yoder, PC (57) ABSTRACT

Systems and methods related to an online security center are provided. For example, one or more processors may determine a distance between electronic devices associated with a user and a login attempt. When a threshold distance is exceeded, an alert may be provided to the electronic device associated with the user.

20 Claims, 5 Drawing Sheets

(56) References Cited

U.S. PATENT DOCUMENTS

| | | |
|---|---|---|
| 2014/0157381 A1* | 6/2014 | Disraeli .............. H04L 63/0853 |
| | | 726/7 |
| 2015/0106900 A1 | 4/2015 | Pinski |
| 2015/0244714 A1 | 8/2015 | Kundu |
| 2015/0254452 A1* | 9/2015 | Kohlenberg ............ G06F 21/45 |
| | | 726/6 |
| 2015/0264573 A1 | 9/2015 | Giordano |
| 2016/0021102 A1 | 1/2016 | Palm |
| 2016/0088432 A1 | 3/2016 | Myers |
| 2016/0212129 A1 | 7/2016 | Johnston |
| 2017/0026830 A1 | 1/2017 | Singh |
| 2017/0076265 A1 | 3/2017 | Royyuru |
| 2017/0155686 A1 | 6/2017 | Yanacek |
| 2017/0289813 A1 | 10/2017 | Pashkov |
| 2018/0108246 A1 | 4/2018 | Garg |

* cited by examiner

ONLINE SECURITY CENTER

CROSS-REFERENCE TO RELATED APPLICATIONS

This application is a continuation of U.S. application Ser. No. 17/164,478 filed Feb. 1, 2021, entitled "ONLINE SECURITY CENTER", which is a continuation of U.S. application Ser. No. 15/433,689 filed Feb. 15, 2017 entitled "ONLINE SECURITY CENTER", which claims priority to and the benefit of U.S. Provisional Patent Application No. 62/297,288, entitled "ONLINE SECURITY CENTER", filed Feb. 19, 2016, which is herein incorporated by reference in its entirety for all purposes.

BACKGROUND

The present disclosure relates generally to systems and methods for providing an online security center, and more specifically, to monitoring and managing numerous accounts via the online security center.

Websites and/or applications that utilize user accounts typically request that a username and a password be specified during registration. However, oftentimes, the websites have different password specifications, thereby leading to a user creating numerous different passwords for different websites and/or applications. As may be appreciated, it may be difficult to keep track of all of the different passwords for the disparate websites and/or applications. Further, hackers are gaining access to private databases that include user credentials more frequently, and the users may not even be aware that their accounts are compromised. It is now recognized that there is a continued need for improving user account monitoring and management.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, one or more tangible, non-transitory, computer-readable mediums may include computer-readable instructions that cause a processor of a computer to receive authentication information via a first website, a first application, or both. The authentication information is associated with an account registered with a second website, a second application, or both, of a different domain than the first website, the first application, or both. The processor of the computer may store the authentication information. The processor may receive input of a selection related to managing a stored password of the authentication information. The processor may, when the input indicates that the first website, the first application, or both, should manage the authentication information, automatically generate a new password based at least in part on one or more password specifications that enhance security of the new password, a configurable time limit for changing the authentication information, or some combination thereof. The processor may display a recommendation including the new password, automatically change the stored password to the new password, or some combination thereof, based on the input.

In another embodiment, a system includes a processor operatively coupled to a memory. The processor receives, via a graphical user interface (GUI), at least one selection of account information to add to an account list, wherein the account list comprises a list of websites, applications, or both, to which a user has one or more accounts. The processor adds the account information to the account list, based upon the at least one selection. The processor determines whether a potential data breach associated with the account information has occurred. When a potential data breach associated with the account information has occurred, the processor performs a corrective action for the potential data breach.

In another embodiment, a method includes determining a first location of a device used to perform an action comprising logging in to a website or application using an account, performing a transaction on the website or application, or both. The method includes, at a time proximate to the login, determining a second location of a mobile device associated with the account. The method includes determining whether a distance between the first location of the device and the second location is greater than a first threshold distance. The method further includes performing a preventative action when the first location is greater than the first threshold distance away from the second location.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for providing an online security center for a website and/or application. In some embodiments, the online security center may be included in an existing web portal or application (e.g., mobile application) that is used by a service providing entity (e.g., insurance provider, financial adviser). Additionally or alternatively, the online security center may be a stand-alone software utility or service with which web portals or applications interface. The online security center may provide numerous functionalities related to managing specified website and/or application accounts specified by the user of the online security center. The functionalities may be exposed and useable through a graphical user interface (GUI) of the online security center. For example, the user may select a website and/or application that the user desires the online security center to manage, and the user may provide the credentials to the account for that particular website and/or application. The GUI may provide a list of the selected websites and/or applications, and the online security center may automatically login to the website and/or applications when the user clicks on its respective hyperlink by entering the credentials.

Further, in some embodiments, the online security center may provide the user an option to manage the password for the user. When the option is selected, the online security center may generate a new strong password to comply with the password specifications from the particular website and/or application. The online security center may continue to change the passwords for the managed websites and/or applications based on a configurable amount of time. The online security center may provide a copy-to-clipboard functionality that enables the user to obtain the auto-generated password as desired. Additionally, the online security center may include its own internal password specifications for strong passwords and may alert the user when the password for any website and/or application is determined to not comply with the internal password specifications. In some embodiments, the online security center may monitor selected websites and/or applications for one or more events and perform an action when the events occur. For example, the online security center may monitor the media for news related to a website and/or application data breach. In such an instance, the online security center may automatically change the password for that particular website and/or application, recommend changing the password, and/or notify the user of the data breach, among other things.

Also, the online security center may compare the geographic location of where an account is logged in to versus the geographic location of a mobile computing device (e.g., smartphone) of the user to determine whether potential fraudulent activity is occurring. If detected, the online security center may perform a preventative action. As may be appreciated, the online security center may provide several benefits, such as automatic user password management without the user having to remember numerous disparate passwords to different websites and/or applications, automatic data breach and/or fraud detection, and/or recommendation and alerting services, among other things.

Figure 1:
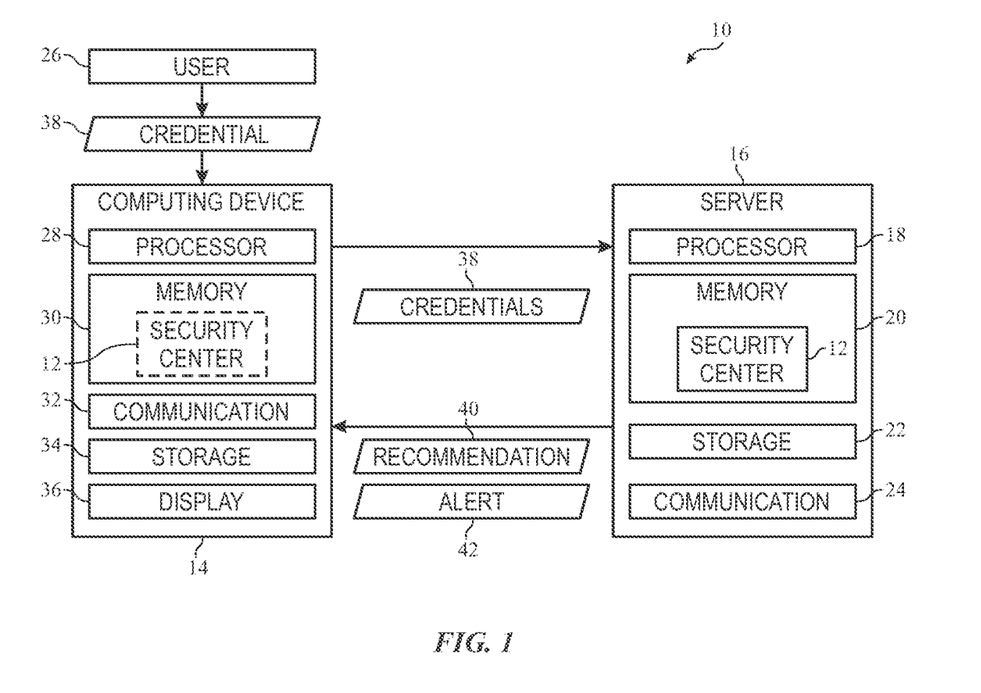
FIG. 1 is a block diagram of components of a system that uses an online security center in a website or an application, in accordance with embodiments described herein.

With the foregoing in mind, FIG. 1 is a block diagram of example components of a system 10 that uses an online security center 12 in a website (e.g., web portal) or an application. The system 10 may include a computing device 14 in communication with a server 16. The computing device 14 may be a personal computer, laptop, tablet, smartphone, or the like. In some embodiments, the computing device 14 may function as a client to the server 16, and the system 10 may use client-server architecture.

The server may include a processor 18, a memory 20, a storage 22, a communication component 24, and the like. The communication component 24 may be a wireless or wired communication component that may facilitate communication between the server 16 and the computing device 14. The processor 18 may be any type of computer processor or microprocessor capable of executing computer-executable code. The processor 18 may also include multiple processors that may perform the operations described below. The memory 20 and the storage 22 may be any suitable articles of manufacture that can serve as media to store processor-executable code, data, or the like. These articles of manufacture may represent computer-readable media (e.g., any suitable form of memory or storage) that may store the processor-executable code used by the processor 18 to perform the presently disclosed techniques. For example, as depicted, the memory 20 may store the processor-executable code that implements the online security center 12 when the online security center 12 is incorporated into a web portal or a service accessed from the computing device 14. Additionally, the memory 20 and/or the storage 22 may store the credentials to various website and/or application accounts when desired by a user 26. The memory 20 and the storage 22 may represent tangible, non-transitory computer-readable media (e.g., any suitable form of memory or storage) that may store the processor-executable code used by the processor 18 to perform various techniques described herein. It should be noted that non-transitory merely indicates that the media is tangible and not a signal.

The computing device 14 may include similar components as the server 16, such as a processor 28, a memory 30, a storage 34, a communication component 32, and the like. Additionally, the computing device 14 may include a display 36. The communication component 32 may be a wireless or wired communication component that may facilitate communication between the computing device 14 and the server 16. The processor 28 may be any type of computer processor or microprocessor capable of executing computer-executable code. The processor 28 may also include multiple processors that may perform the operations described below. The memory 30 and the storage 34 may be any suitable articles of manufacture that can serve as media to store processor-executable code, data, or the like. These articles of manufacture may represent computer-readable media (e.g., any suitable form of memory or storage) that may store the processor-executable code used by the processor 28 to perform the presently disclosed techniques. For example, as depicted, the memory 30 may (optionally) store the processor-executable code that implements the online security center 12 when the online security center 12 is incorporated into an application (e.g., mobile application) installed on the computing device 14 or a stand-alone software utility installed on the computing device 14. Additionally, the memory 30 and/or the storage 34 may store the credentials to various website and/or application accounts when desired by the user 26. The memory 30 and the storage 34 may represent non-transitory computer-readable media (e.g., any suitable form of memory or storage) that may store the processor-executable code used by the processor 28 to perform various techniques described herein. It should be noted that non-transitory merely indicates that the media is tangible and not a signal.

The display 36 may operate to depict a graphical user interface of the online security center 12 via a website accessed by a browser installed on the computing device 14 and/or an application installed on the computing device 14, among other things. In some embodiments, the display 36 may be a touch display capable of receiving inputs from a user 26 of the online security center 12. The display 36 may be any suitable type of display, such as a liquid crystal display (LCD), plasma display, or an organic light emitting diode (OLED) display, for example.

The online security center 12 may be referred to as "online" because it enables managing user accounts for websites and/or applications over a network (e.g., the Internet, a cellular network, local area network, and the like). For example, the user 26 may select the websites and/or applications to add to the online security center 12 to manage and provide initial credentials 38 to the online security center 12. The credentials may include a username and password for an account of the user 26. The online security center 12 may store the credentials in the memory 30 or storage 34 when the online security center 12 is part of an application installed on the computing device 14 or a stand-alone software utility installed on the computing device 14. However, as depicted, when the online security center is included in a web portal or a service hosted by a server 16, the computing device 14 may transmit the credentials 38 to the server 16 for storage and usage in logging into selected websites and/or applications from the online security center 12 from the server 16, changing the credentials, and the like.

It should be noted that the online security center 12 may function in an offline mode when a network is not available. In the offline mode, the online security center 12 may provide limited functionality, such as allowing the user 26 to choose new websites and/or applications for the online security center 12 to manage and storing the user entered credentials 38 for those websites and/or applications. However, as may be appreciated, the actual logging into the websites and/or applications using the credentials, changing the passwords, or the like may not be performed until the online security center 12 is connected a network capable of accessing the desired websites and/or applications.

As briefly noted above, the online security center 12 may provide one or more recommendations 40 and/or alerts 42 to the computing device 14 of the user 26. For example, the online security center 12 may send a recommendation 40 to change a password for a managed website and/or application to a password that is more robust and secure (e.g., contains certain character length, upper case letters, lower case letters, numbers, special characters). The recommendation may also suggest changing the password if the user has not changed the password in a certain amount of time. Additionally, the alert 42 may notify the user 26 via the computing device 14 that a data breach has been reported for a particular managed website and/or application, that the online security center 12 automatically changed the password to that particular managed website and/or application, and the like. In some embodiments, the alerts 42 may be sent via short message service (SMS) text message, electronic mail, telephone call, or the like.

It should be noted that the components described above with regard to the computing device 14 and the server 16 are example components and the computing device 14 and the server 16 may include additional or fewer components as shown. Additionally, it should be noted that there may be numerous computing devices 14 and numerous servers 16 that are used in the system 10.

Figure 2:
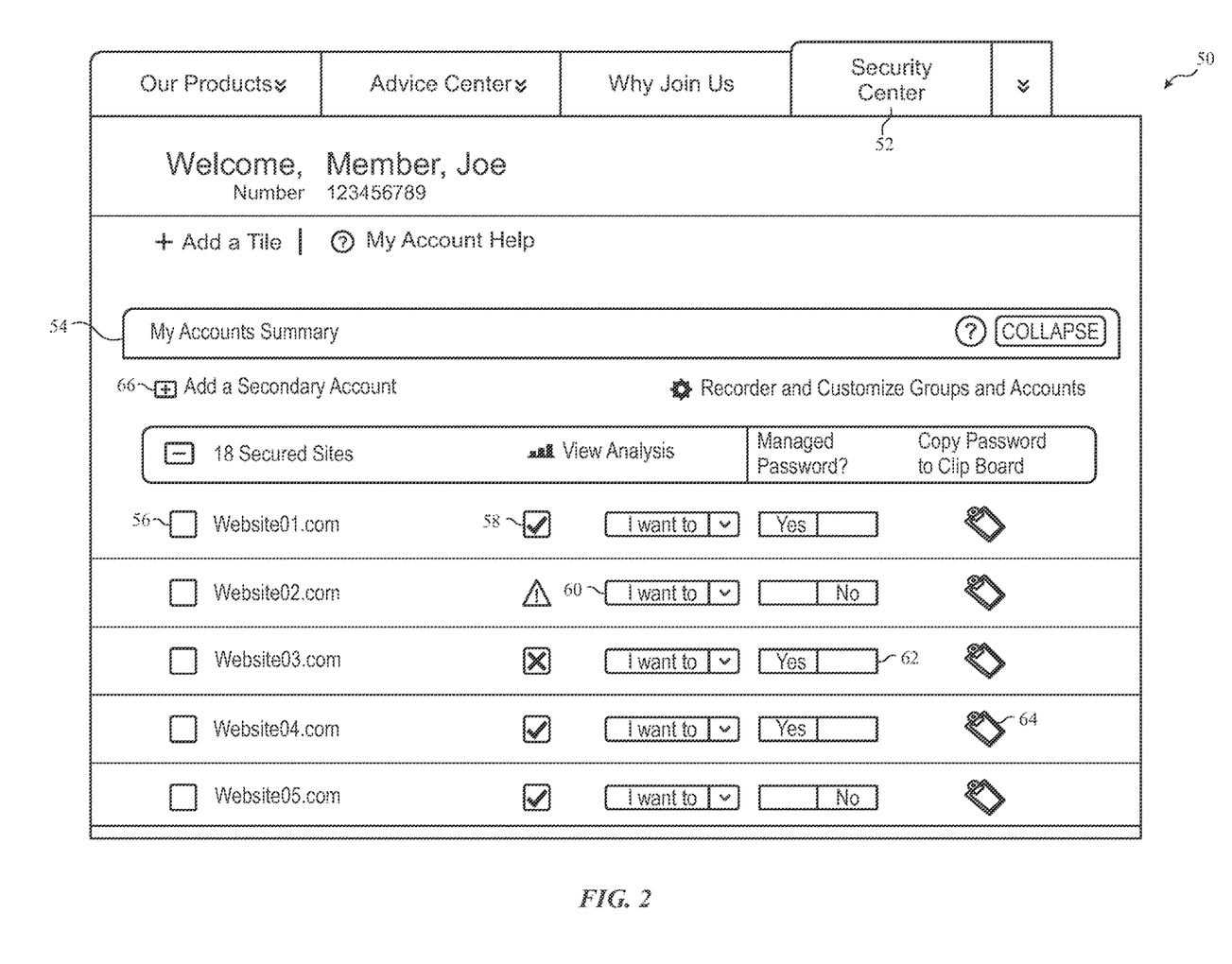
FIG. 2 is a screenshot of a graphic user interface of the online security center in FIG. 1, in accordance with embodiments described herein.

FIG. 2 is a screenshot of a graphical user interface (GUI) 50 of the online security center 12 in FIG. 1, in accordance with embodiments described herein. The GUI 50 may be included in an application (e.g., mobile application) installed on the computing device 14 or in a website (e.g., web portal) hosted by the server 16. As such, the application and/or website may include various tabs, such as information about products of the service providing entity associated with the application and/or website, an advice center, and the like. However, a tab 52 for the online security center 12 may be included in the GUI 50. Upon selection of the online security center tab 52, the GUI 50 may be displayed as a unique landing area. The GUI 50 may display various types of primary account information related to the user 26, such as name and account number, among other information.

It should be understood that the primary account may refer to the account that is used by the user 26 to access the online security center 12 through the website and/or application of the service providing entity. Secondary accounts may refer to accounts registered with other websites and/or applications that are added to the online security center 12 and for which account management is desired through the online security center 12.

In addition, the GUI 50 of the online security center 12 may include a secondary accounts summary table 54. The secondary accounts summary table 54 may display a list of websites and/or applications hyperlinks 56 to which the user has added secondary account credentials, a respective status indicator 58, a user control dropdown menu 60, a respective managed indicator 62, and a respective copy-to-clipboard button 64. In some embodiments, the websites and/or applications that are provided by the GUI 50 of the online security center 12 may have been authenticated as secured websites and/or applications by the online security center 12 prior to being enabled as selectable to the user 26. That is, the online security center 12 may authenticate a website by providing credentials that only the website should know and/or using one or more authentication protocols. Some of the authentication protocols may authenticate the website by using a token generated by the server 16 without using credentials and may implement hypertext transfer protocol secure (HTTPS) for secure communication over a network. The user 26 can add secondary accounts for additional websites and/or applications by clicking button 66 and providing the requested information, such as username and/or password for the secondary account. The online security center 12 may store the user entered credentials in the memory 20, 30 or storage 22, 34, depending on implementation. In some embodiments, the passwords may be encrypted before being stored and may be decrypted when retrieved prior to being used.

In some embodiments, the user may desire to add a secondary account to a website and/or application that is not supported by the online security center 12 or integratable with the online security center 12. However, the online security center 12 may store the secondary account information for the unsupported website and/or application and provide a notification to the user 26 when support for the website and/or application becomes available. For example, the notification may be provided when an application programming interface (API) is provided by the website and/or application or is published by the website and/or application that exposes functionality to manage the secondary account associated with the website and/or application. Additionally or alternatively, the notification may be provided when a script is developed that navigates a menu tree of the website and/or application to manage the secondary account associated with the website and/or application. It should be understood that the notification may be provided when support for the desired website and/or application becomes available in the online security center 12 via any implementation.

When the user 26 selects one of the hyperlinks 56 to access, a script or program may be executed by the online security center 12 to pre-fill the username and password for the selected website or application and automatically login to the website or application. For example, in some embodiments, a new browser window may be opened for the selected website, and a uniform resource locator (URL) to the login page of the website or application may be entered into the search bar that includes a query string including the username and password to automatically login to the website or application. For mobile applications, the online security center 12 may execute a script or program that launches the selected application and enters the username and password to directly login to the application. In this way, the user may directly login to any supported website and/or application through the online security center 12 without having to reenter their credentials each time they access the website or application. Further, because the online security center 12 maintains numerous secondary accounts for disparate websites and/or applications, users 26 may prefer to access the websites and/or applications through the secondary accounts summary table 54 to avoid having to remember each of the different passwords for each respective website or application. It should be noted that the new browser that is opened upon selection of a hyperlink may use a web virtual private network (VPN) of the original website (e.g., web portal) including the online security center 12. The new browser window opened using the VPN may include encryption and protection against malware and/or viruses. Thus, it should be understood that the website and/or application including the online security center 12 for the service providing entity may include its own security (e.g., biometrics) that adds security measures for the added websites and/or applciations. With the foregoing in mind, it should also be understood that the online security center 12 may increase traffic to the service providing entity website and/or application that includes the online security center 12 due to the beneficial features discussed herein.

The respective status indicator 58 for the secured websites and/or applications included in the list of the secondary accounts summary table 54 may display a graphic and/or text or emit audio indicative of an "all clear," "action required," or "known data breach." In some embodiments, the "all clear" status indicator 58 may be represented as a checkmark, as depicted. However, any suitable graphic, text, and/or audio indicator 58 that conveys an "all clear" status may be used. In some embodiments, the "action required" status indicator 58 may be represented as an exclamation mark, as depicted. However, any suitable graphic, text, and/or audio indicator 58 that conveys an "action required" status may be used. In some embodiments, the "known data breach" status indicator 58 may be represented as a burglar, as depicted. However, any suitable graphic, text, and/or audio indicator 58 that conveys a "known data breach" status may be used.

The "all clear" status indicator 58 may be displayed when there is no detected data breach of the website and/or application associated with the secondary account, the password for the secondary account is strong (e.g., meets password specifications), the password has been changed within the recommended timeframe (e.g., one, two, three months), and the like. The "action required" status indicator 58 may be displayed when the password for the secondary account is not strong enough (e.g., does not meet password specifications), the password has not been changed in the recommended time frame, and the like. The "known data breach" status indicator 58 may be displayed when the online security center 12 determines that the website and/or application associated with the secondary account has been subjected to a data breach (e.g., hacker has potentially obtained information related to the secondary account of the user 26).

The user control dropdown menu 60 associated with each respective secondary account of the websites and/or applications in the secondary accounts summary table 54 provides numerous functionalities to the user 26, such as viewing the secondary account password, changing the secondary account username, changing the secondary account password manually, and/or requesting the online security center 12 to recommend a strong password that meets the password specifications of the selected website and/or application. In some embodiments, if the user 26 selects a recommended password, the online security center 12 may update the user credentials for all secondary accounts of the websites and/or applications as long as the password meets the password specifications for the websites and/or applications. In this way, the passwords may be uniformly updated to enable case of remembrance between disparate websites and/or applications and reduce complexity in managing the passwords.

The respective managed indicator 62 may include a graphical element that enables selection, such as radio buttons, a slider, checkboxes, and the like. The managed indicator 62 includes a binary value of "yes" or "no" for whether the user desires the online security center 12 to manage the secondary account password. When the user selects "yes," the online security center 12 may generate a secure secondary account password (e.g., strong password that includes upper case letters, lower case letters, numbers, and special characters) based on password specifications of the website and/or application associated with the secondary account and/or from internal password specifications of the online security center 12. The online security center 12 may automatically change the secondary account password to the newly generated secure password by using the initial secondary account password provided by the user 26 as soon as the user selects "yes" for the managed indicator 62 and/or after a configurable time limit (e.g., one, two, three months). It should be appreciated that, in some embodiments, if the managed indicator 62 is set to "yes," the online security center 12 may automatically update the secondary account password without further interaction from the user 26. In this way, the secondary account password may be continuously updated to secure passwords, thereby enhancing the security of the secondary account of the user for the added website and/or application. It should be noted that the online security center 12 may acquire the requirements of a password from a relevant site and apply the requirements when automatically generating a password.

When the managed indicator 62 is set to "no," the online security center 12 may provide recommendations 40 to update the secondary account password if the secondary account password is determined to be not strong enough, has not been updated within the configurable time limit, or the like. The online security center 12 may generate a secure secondary account password to include in the recommendation 40, and the user 26 can manually update the secondary account password using the user control dropdown menu 60 or by accessing the secondary website and/or application. The recommendation 40 from the online security center 12 may acquire relevant password requirements and provide recommendations that are in compliance with such requirements.

The copy-to-clipboard button 64 may copy the secondary account password associated with the website and/or application so the user 26 can paste it in a desired location. For example, the user 26 may desire to set other secondary account passwords to the copied password to keep the secondary account passwords uniform. Additionally, the user 26 may desire to update the password of the service providing entity website and/or application that includes the online security center 12 to the generated password and can do so by pasting the copied password into an update password field. The online security center 12 may detect noncompliant passwords (relative to certain applications or websites) when they are modified or generated by a user prior to attempting to implement the password in a relevant account (e.g., application or website).

FIGS. 3-7 are flow charts of methods for performing various functionalities using the online security center 12. Although the following description of the methods in FIGS. 3-7 are described with reference to the online security center 12 (e.g., implemented as processor-executable code stored on the memory 20) executing via the processor 18 of the server 16, it should be noted that the methods may be performed by the online security center 12 executing via other processors disposed on other devices that may be capable of communicating with the server 16, such as the computing device 14, or other components associated with the system 10. Additionally, although the following methods describe a number of operations that may be performed by the online security center 12, it should be noted that the methods may be performed in a variety of suitable orders and all of the operations may not be performed. It should be appreciated that the methods may be wholly executed by the server 16 or the execution may be distributed between the server 16 and the computing device 14.

Figure 3:
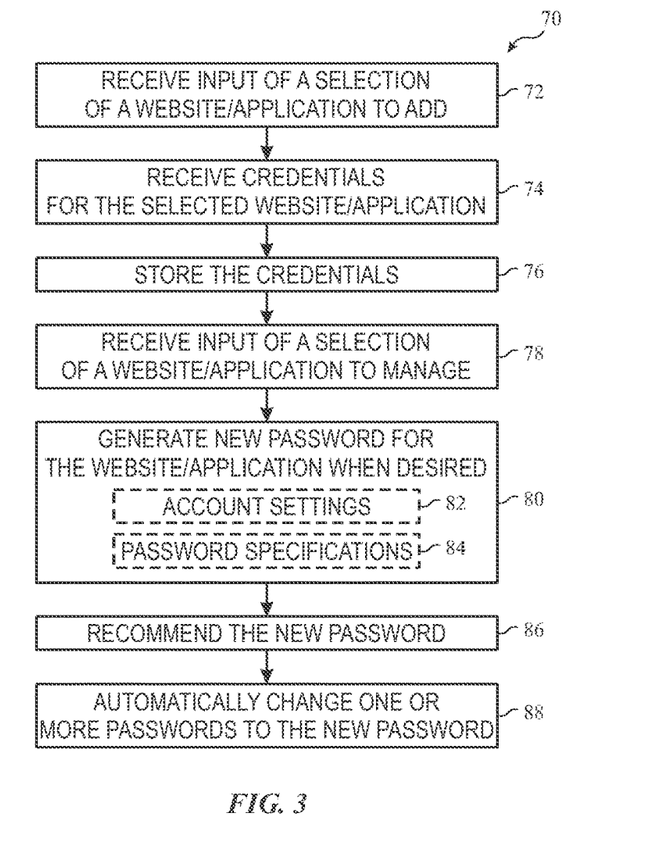
FIG. 3 is a flow chart of a method for managing passwords for various websites or applications using the online security center, in accordance with embodiments described herein.

Turning to FIG. 3, a flow chart of a method 70 for managing secondary account passwords for various websites and/or applications using the online security center 12 is illustrated. The processor 18 may receive (block 72) input of a selection of a website or application to add. For example, the user 26 may click on the button 66 to add a secondary account and pick the secured website or application from a list. Adding the website and/or application may cause the website and/or application to be displayed in the list of the secondary account summary table 54 on the GUI 50 of the online security center 12. The websites and/or applications that are available to choose from may include any website and/or application that uses an account with credentials and that can be authenticated by the online security center 12. Example websites and/or applications may include social media, banking, gaming, insurance, email, productivity, and/or other services. The processor 18 may receive (block 74) the credentials 38 (e.g., username and password) for the secondary account associated with the selected website or application to add to the online security center 12. The processor 18 may store (block 76) the credentials in the memory 20 or storage 22. In some embodiments, the processor 18 may use cryptographic techniques to secure the password prior to storage.

The processor may receive (block 78) input of a selection of the website or application to manage. For example, the user 26 may use the manage indicator 62 to select "yes" or "no" to indicate whether the secondary account password of the respective website or application should be managed by the online security center 12. The processor 18 may generate (block 80) a new secure password for each of the websites and/or applications that have been added to the online security center 12. In some embodiments, the processor 18 may generate the new secure password based on primary account settings 82, such as a configurable timeframe to update the secondary account passwords. Further, the processor 18 may generate the new secure password based on password specifications 84 (e.g., of the external website and/or application to manage and/or of the online security center 12). The strength of the password may be based on varying the combination of letters, case of letters, numbers, and/or special characters. That is, a weak password may refer to a regularly used sequence of numbers, such as "12345," or a characteristic of the user that is potentially learnable by a hacker, such as a residential state where the user lives (e.g., "Texas"), among other things. On the other hand, a strong password may include passwords that are of a certain alphanumeric length (e.g., at least six) and combine a certain number of upper case letters (e.g., at least one), lower case letters (e.g., at least one), numbers (e.g., at least one), and/or special characters (e.g., at least one), and generally are not actual words. For example, a strong password may be "AdTIsd22!" or "12asTR@". Strong passwords are not easily guessable, thereby strengthening the security of the user account. Accordingly, the processor 18 may use a random number generator, a random letter generator, and/or a random special character generator to generate a random strong password that meets the password specifications 84.

In some embodiments, the processor 18 may recommend (block 86) that the user 26 changes the secondary account password to the newly generated secondary account password. Further, the processor 18 may recommend a time schedule (e.g., one, two, three months) that the user 26 changes the secondary account password. In some embodiments, the recommendations 40 may be provided when the user selected "no" using the manage indicator 62. For example, when the secondary account password has not been changed longer than the configurable timeframe, then the processor 18 may send the recommendation 40 to the computing device 14 to display via the display 36. Additionally, the processor 18 may analyze the secondary account password associated with the website and/or application that was provided by the user 26 to determine the strength of the password. When the password is determined to not be strong, the processor 18 may provide the recommendation 40 to change the password to the generated strong password.

The processor 18 may automatically change (block 88) one or more second account passwords to the new password. In some embodiments, the processor 18 may automatically change the secondary account passwords for the website and/or application that the user selected "yes" with the manage indicator 62. The automatic change may occur after a configurable timeframe and/or when the secondary account password is determine to not be strong based on the password specifications. For example, a website and/or application may change its password specifications to request different character length or different combinations of alphanumeric characters. The online security center 12 may query the website and/or application for the password specifications and determine that the current password for that particular website and/or application does not comply with the specifications. As such, the processor 18 may generate a new password that complies with the updated password specifications. In some embodiments, the processor 18 may just update each individual secondary account password associated with the respective managed website and/or application by default. Thus, the processor 18 may generate different random secondary account passwords for each of the managed websites and/or applications.

To update a secondary account password, the processor 18 may execute a script that includes processor-executable instructions. The script may use an application programming interface (API) or service of the website and/or application to call functions to change the secondary account password, when available. In such instances, the script may pass the username and current secondary account password as well as the new secondary account password to the function call of the API or service. Upon a successful update, the API or service function call may return a positive acknowledgment (ACK), and upon failure, the API or service function call may return a negative acknowledgment (NACK). The script may display a message on the GUI 50 of the online security center 12 displaying either a success or failure message accordingly.

When an API or service that exposes password updating functions is not available, the script may be configured to login to the website or application using the username and current secondary account password and navigate the menu and/or submenus on the website and/or application graphical user interface to change the password. Typically, the option to change a password is located in a profile or account option in a menu, so the script may select the profile or account option, and then choose "update password." The script may be configured to enter the current password, as well as the new secondary account password and select "update" or "save". If the secondary account password is updated successfully, the script may logout of the website and/or application and generate a successful message to display on the GUI 50 of the online security center 12. If the secondary account password is not updated successfully, the script may logout of the website and/or application and generate a failure message to display on the GUI 50.

However, the updated password may be propagated to the other secondary accounts associated with websites and/or applications being managed by the online security center 12 in an attempt to keep the passwords as uniform as possible. Uniformly updating the secondary account passwords associated with the managed websites and/or applications may be a setting configurable by the user 26 in the online security center 12. When the user 26 sets the setting to uniformly update the secondary account passwords associated with the managed websites and/or accounts, the processor 18 may generate a single strong password and update all of the secondary account passwords to the new strong password taking into account respective password requirements. A single password may not be capable of complying with all accounts but present embodiments may define an overlap between passwords when certain password requirements from different accounts conflict. In some embodiments, the processor 18 may automatically change the secondary account password to a newly generated password when the managed indicator 62 is set to "no" but the user accepted the newly generated secondary account password displayed in a recommendation 40.

Figure 4:
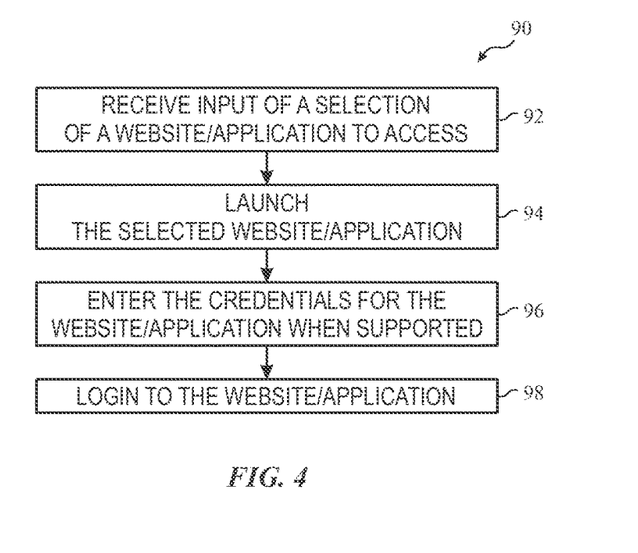
FIG. 4 is a flow chart of a method for automatically logging in to added websites or applications from the online security center, in accordance with embodiments described herein.

FIG. 4 is a flow chart of a method 90 for automatically logging in to supported websites or applications from the online security center 12, in accordance with embodiments described herein. The processor 18 may receive (block 92) input of a selection of a website or application to access. For example, the user 26 may use an input peripheral, such as a mouse or a touch-screen, to select the hyperlink for a particular social media website displayed on the secondary account summary table 54. In response to the selection, the processor 18 may launch (block 94) the website in a new browser window or launch the application when the application is installed on the computing device 14. In some embodiments, the website may be launched behind the secure portal using a VPN that includes antivirus protection and/or cookie blocking that is also protecting the website and/or application including the online security center 12 of the service providing entity. The processor 18 may automatically enter (block 96) the credentials (e.g., username and password) of the secondary account of the user 26 into the selected website or application and login (block 98) to the website or application. In this way, the user 26 does not have to write down the password and retype it into the website or application credential inputs or copy and paste the password. The online security center 12 enables directly logging into the websites and/or applications added with a single selection of the website or application.

As may be appreciated, a mobile application that includes the online security center 12 may launch the application associated with a hyperlink selected in the secondary account summary table 54 instead of a website, when the selected application is installed on the computing device 14. If the selected mobile application is not installed on the computing device 14, then the processor 18 may launch an application store and recommend that the user download the desired mobile application.

Figure 5:
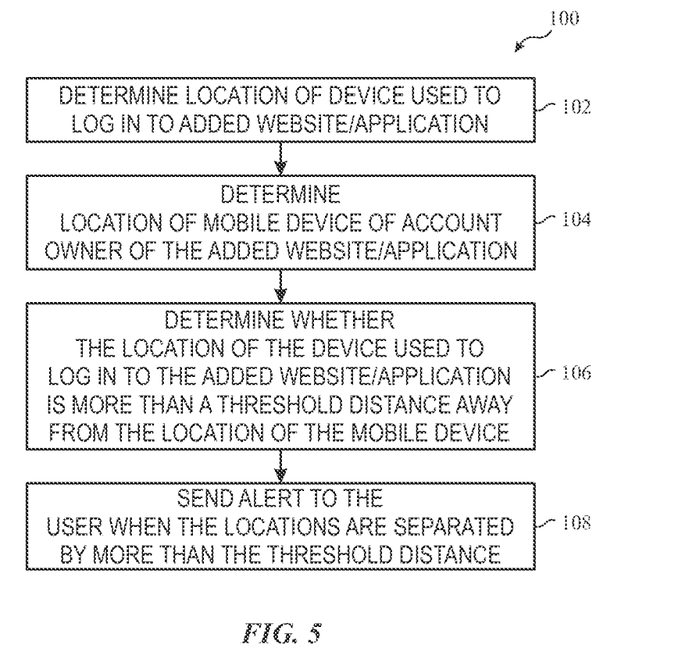
FIG. 5 is a flow chart of a method for determining a potential data breach based on geographic location of a login to a website account and/or an application account, in accordance with embodiments described herein.

FIG. 5 is a flow chart of a method 100 for determining a potential data breach based on geographic location of a login to a website account and/or an application account, in accordance with embodiments described herein. In some embodiments, the user 26 may select from a list of supported websites and/or application to enable enhanced GPS protection on the online security center 12. In such instances, the user may select the website and/or application and provide the username associated with their registered secondary account. It should be noted that the password may not be provided or used in some embodiments of the enhanced GPS protection techniques disclosed herein. In some embodiments, the processor 18 may establish a partnership with the websites and/or applications entered by the user 26. For example, the processor 18 may provide a batch at a desired interval (e.g., hourly, daily, nightly, weekly, monthly) of all enrolled members to the respective websites and/or accounts associated with the secondary accounts entered by the user 26. The processor 18 may determine (block 102) a location of a first computing device that is used to login to a secondary account of a website and/or application added to the online security center 12. Certain websites and/or applications obtain the IP address of the first computing device used to login to associated accounts. The online security center 12 may request the Internet Protocol (IP) address for the first computing device from the websites and/or applications when the accounts are logged into. Using Global Positioning System (GPS), the processor 18 may use the IP address to determine the location of the first computing device used to login to the secondary account. In some embodiments, the processor 18 may determine the location of the first computing device by receiving real time data from the website and/or application indicating the logon and the approximate geographical location of the first computing device based on the IP address. Further, processor 18 may determine (block 104) a location of a second computing device (e.g., mobile computing device 14, such as a smartphone) of the user 26 who owns the secondary account of the website and/or application added to the online security center 12. In some embodiments, the processor 18 may use the IP address of the second computing device and GPS to determine the location of the second computing device. Then, the processor 18 may determine (block 106) whether the location of the first computing device used to login to the website and/or application is more than a threshold distance away (e.g., one, two, three miles) from the second computing device. When the devices are separated by more than the threshold distance, the processor 18 may send (block 108) an alert to the user (e.g., via email or SMS text message). In some embodiments, the alert may indicate that secondary account of the website or application was logged into from a suspicious location and be displayed via the display 36 of the computing device 14.

In some embodiments, the processor 18 may automatically generate a new strong password and change the secondary account password as soon as a suspicious login is detected. Also, in some embodiments, the processor 18 may generate a new strong password and recommend that the user 26 changes the secondary account password for the website and/or application when a suspicious login is detected. It should be noted that the GPS location of the computing device 14 may be deleted after data verification is complete and not provided to any third parties.

Figure 6:
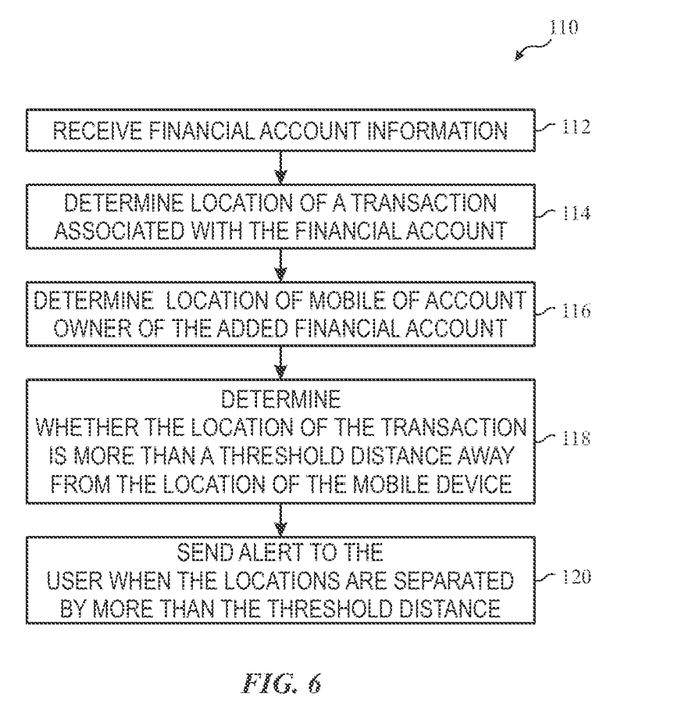
FIG. 6 is a flow chart of a method for determining a potential data breach based on geographic location of a transaction associated with a financial account, in accordance with embodiments described herein.

FIG. 6 is a flow chart of a method 110 for determining a potential data breach based on geographic location of a transaction associated with a financial account, in accordance with embodiments described herein. The processor 18 may receive (block 112) financial account information and store the financial account information. By way of example, in some embodiments, the processor 18 may receive a credit card number for a credit card account and the name of the user 26 as it appears on the credit card associated with the credit card account. However, it should be noted that other financial accounts may be monitored, such as debit cards, checking accounts, savings accounts, health savings accounts, retirement accounts, and so forth. In some embodiments, no online credentials may be input by the user 26. The processor 18 may establish a partnership with the credit card company of the credit card entered by the user 26. For example, the processor 18 may provide a batch at a desired interval (e.g., hourly, daily, nightly, weekly, monthly) of all enrolled account numbers (e.g., credit card numbers) and users 26 to the respective financial institutions (e.g., credit card companies) associated with the financial accounts.

Whenever a transaction occurs for a financial account (e.g., credit card) enrolled in the online security center 12, the processor 18 may determine (block 114) a location of the transaction associated with the financial account. In some embodiments, determining the location of the transaction may include obtaining the IP address of the device used to process the transaction (e.g., credit card machine on a cash register) and determining the geographical location of the IP address using GPS. In some embodiments, the processor 18 may determine the location of the transaction by receiving the location of the transaction from the financial institution associated with the account. Further, the processor 18 may determine (block 116) a location of a mobile computing device 14, such as a smartphone, of the user 26 who owns the financial account associated with the transaction. In some embodiments, the processor 18 may use the IP address of the mobile computing device and GPS to determine the location of the mobile computing device. In some embodiments, the processor 18 may ping the mobile computing device for its geographic location.

Then, the processor 18 may determine (block 118) whether the location of the transaction is more than a threshold distance away (e.g., one mile) from the location of the mobile computing device. When the locations are separated by more than the threshold distance, the processor 18 may send (block 120) an alert to the user (e.g., via email, SMS text message, phone call). In some embodiments, the alert may indicate that a transaction associated with the financial account was made at a suspicious location and the alert may be displayed via the display 36 of the computing device 14. It should be noted that the GPS location of the computing device 14 may be deleted after data verification is complete and not provided to any third parties.

Figure 7:
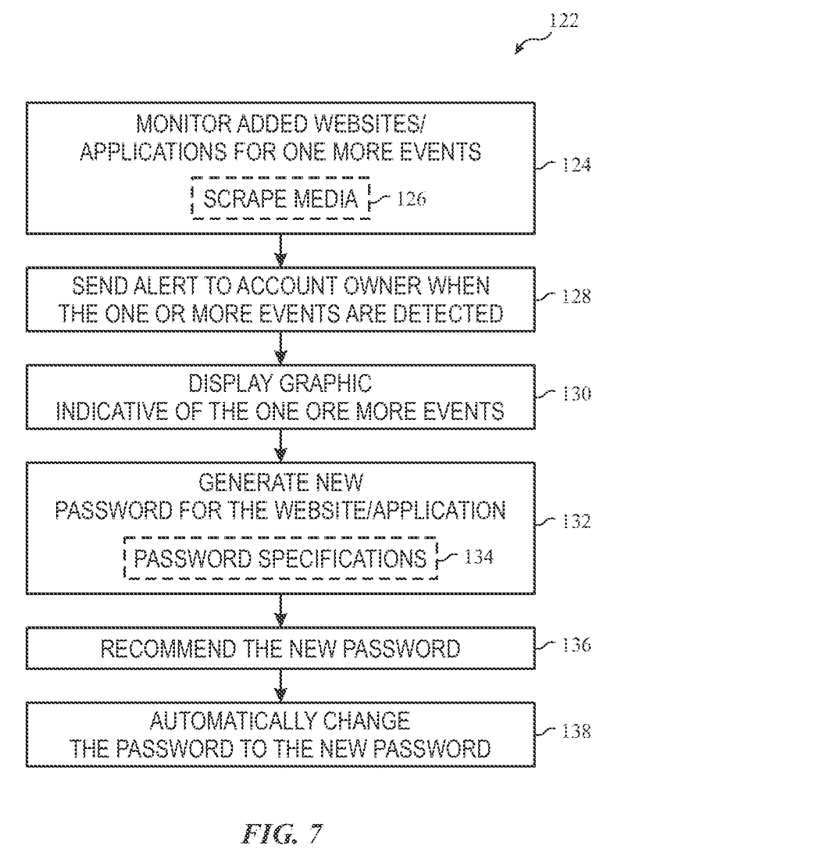
FIG. 7 is a flow chart of a method for monitoring websites and/or applications added to the online security center for one or more events, in accordance with embodiments described herein.

FIG. 7 is a flow chart of a method 122 for monitoring websites and/or applications added to the online security center 12 for one or more events, in accordance with embodiments described herein. Accordingly, the processor 18 may monitor (block 124) the added websites and/or applications for one or more events, such as a data breach. In some embodiments, the processor 18 may perform media scraping techniques 126 by using various search engines to query news related to the added website and/or application. Additionally or alternatively, the processor 18 may subscribe to a Rich Site Summary (RSS) feed provided by the added website and/or application to receive any news published by the website and/or application. When any news or media indicates that the website and/or application has been subjected to some sort of data breach (e.g., user account information exposed and vulnerable), then the processor 18 may send (block 128) an alert 42 to the account owner (e.g., via the display 36). The processor 18 may display (block 130) a graphic, such as the burglar depicted in the GUI 50 of FIG. 2, indicative of the one or more events (e.g., data breach). The graphic may be any suitable color (e.g., red, orange) or form that is useful in indicating that there is a data breach.

Further, the processor 18 may generate (block 132) a new strong secondary account password for the website and/or application that suffered the data breach. As previously discussed, the processor 18 may use internal password specifications 134 and/or password specifications 134 from the website and/or application to ensure that the generated password complies with the password specifications 134. In some embodiments, the processor 18 may send (block 136) a recommendation 40 to the computing device 14 that recommends changing the secondary account password because of the data breach and display the generated password. For example, when the user sets the manage indicator 62 to "no," the processor 18 may send the recommendation. However, the user may be presented a prompt to accept or reject the newly generated secondary account password. When the user accepts the recommended secondary account password, then the processor 18 may automatically change (block 138) the secondary account password to the newly generated one.

Additionally, in some embodiments, the processor 18 may automatically change (block 138) the secondary account password to the new password without sending a recommendation 40 to the user. For example, when the user sets the manage indicator 62 to "yes," the processor 18 may automatically change the secondary account password to the newly generated secondary account password when the data breach is detected without further interaction from the user 26. In this way, the online security center 12 may attempt to reduce the amount of time that any malicious hacker has access to the account of the user by automatically changing the password as soon as possible.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A tangible, non-transitory, computer-readable medium comprising computer-readable instructions that, when executed by one or more processors of a computer, cause the computer to:
   receive, via a graphical user interface (GUI), a request to monitor login locations for a third-party service; and
   in response to the request:
      identify a login to the third-party service;
      in response to the login to the third-party service, identify a first location of a first electronic device used to login to the third-party service;
      identify a second location of a second electronic device associated with a member at a time of the login to the third-party service;
      determine a distance between the first location and the second location;
      compare the distance between the first location and the second location to a pre-determined threshold distance value that, when breached, indicates a possible suspicious location; and
      in response to the distance exceeding the pre-determined threshold distance value;
         provide an electronic alert to the member; and
         cause the processor to automatically generate and register a new password for the third-party service.

2. The non-transitory computer readable medium of claim 1, comprising computer-readable instructions configured to cause the processor to provide the electronic alert to the member by providing a text message to a registered electronic device of the member.

3. The non-transitory computer readable medium of claim 1, comprising computer-readable instructions configured to cause the processor to provide the electronic alert to the member by providing an email message to a registered email address of the member.

4. The non-transitory computer readable medium of claim 1, comprising computer-readable instructions configured to cause the processor to, upon subsequent login attempt by the member to the third-party service, automatically use the new password for the third-party service as authentication information for the third-party service.

5. The non-transitory computer readable medium of claim 4, comprising computer-readable instructions configured to cause the processor to render a graphical user interface (GUI) that presents a list of third-party services, wherein the list comprises a plurality of hyperlinks, wherein each hyperlink of the plurality of hyperlinks is associated with a respective website and respective authentication information, wherein each hyperlink of the plurality of hyperlinks, when selected, is configured to launch the respective website and to log into the respective website using the respective authentication information.

6. The non-transitory computer readable medium of claim 5, comprising computer-readable instructions configured to cause the processor to launch the respective website using a single selection.

7. The non-transitory computer readable medium of claim 1, comprising computer-readable instructions configured to cause the processor to:
   identify the first location of the first electronic device, the second location of the second electronic device, or both using: global positioning information provided via a respective electronic device, an internet protocol (IP) address of the respective electronic device, a response to a ping geolocation request provided by the respective electronic device, or any combination thereof.

8. The non-transitory computer readable medium of claim 1, comprising computer-readable instructions configured to cause the processor to:
   refrain from storing the first location of the first electronic device, the second location of the second electronic device, or both, after verifying that the distance does not exceed the pre-determined threshold distance value.

9. The non-transitory computer readable medium of claim 1, comprising computer-readable instructions configured to cause the processor to:
   refrain from storing the first location of the first electronic device, the second location of the second electronic device, or both to the third-party service.

10. A system comprising:
    a memory; and
    a processor operatively coupled to a memory, wherein the processor is configured to:
    receive, via a graphical user interface (GUI), a request to monitor login locations for a third-party service; and
    in response to the request:
       identify a login to the third-party service;
       in response to the login to the third-party service, identify a first location of a first electronic device used to login to the third-party service;
       identify a second location of a second electronic device associated with a member at a time of the login to the third-party service;
       determine a distance between the first location and the second location;
       compare the distance between the first location and the second location to a pre-determined threshold distance value that, when breached, indicates a possible suspicious location; and
       in response to the distance exceeding the pre-determined threshold distance value;
          provide an electronic alert to the member; and
          cause the processor to automatically generate and register a new password for the third-party service.

11. The system of claim 10, wherein the processor is configured to provide the electronic alert to the member by:
    providing a text message to a registered electronic device of the member;
    providing an email message to a registered email address of the member; or
    both.

12. The system of claim 10, wherein the processor is configured to:
    render a graphical user interface (GUI) that presents a list of third-party services, wherein the list comprises a plurality of hyperlinks, wherein each hyperlink of the plurality of hyperlinks is associated with a respective website and respective authentication information of a respective third-party service, wherein each hyperlink of the plurality of hyperlinks, when selected, is configured to launch the respective website and to log into the respective website using the respective authentication information; and upon selection of a hyperlink associated with the third-party service, cause a login request via a website of the third-party service, that automatically provides the new password for the third-party service.

13. The system of claim 10, wherein the processor is configured to:
identify the first location of the first electronic device, the second location of the second electronic device, or both using: global positioning information provided via a respective electronic device, an internet protocol (IP) address of the respective electronic device, a response to a ping geolocation request provided by the respective electronic device, or any combination thereof.

14. The system of claim 10, wherein the processor is configured to preserve member privacy, by:
refraining from storing the first location of the first electronic device, the second location of the second electronic device, or both, after verifying that the distance does not exceed the pre-determined threshold distance value;
refraining from storing the first location of the first electronic device, the second location of the second electronic device, or both to the third-party service; or both.

15. A computer-implemented method, comprising:
receiving, via a graphical user interface (GUI), a request to monitor login locations for a third-party service; and
in response to the request:
identifying a login to the third-party service;
in response to the login to the third-party service, identifying a first location of a first electronic device used to login to the third-party service;
identifying a second location of a second electronic device associated with a member at a time of the login to the third-party service;
determining a distance between the first location and the second location;
comparing the distance between the first location and the second location to a pre-determined threshold distance value that, when breached, indicates a possible suspicious location; and
in response to the distance exceeding the pre-determined threshold distance value;
providing an electronic alert to the member; and
automatically generating and registering a new password for the third-party service.

16. The computer-implemented method of claim 15, comprising:
rendering a graphical user interface (GUI) that presents a list of third-party services, wherein the list comprises a plurality of hyperlinks, wherein each hyperlink of the plurality of hyperlinks is associated with a respective website and respective authentication information of a respective third-party service, wherein each hyperlink of the plurality of hyperlinks, when selected, is configured to launch the respective website and to log into the respective website using the respective authentication information; and
upon selection of a hyperlink associated with the third-party service, causing a login request via a website of the third-party service, that automatically provides the new password for the third-party service.

17. The computer-implemented method of claim 15, comprising:
identifying the first location of the first electronic device, the second location of the second electronic device, or both using: global positioning information provided via a respective electronic device, an internet protocol (IP) address of the respective electronic device, a response to a ping geolocation request provided by the respective electronic device, or any combination thereof.

18. The computer-implemented method of claim 15, comprising:
preserving member privacy, by:
refraining from storing the first location of the first electronic device, the second location of the second electronic device, or both, after verifying that the distance does not exceed the pre-determined threshold distance value;
refraining from storing the first location of the first electronic device, the second location of the second electronic device, or both to the third-party service; or both.

19. The non-transitory computer readable medium of claim 1, wherein the pre-determined threshold distance value comprises: 1 mile, 2 miles, or 3 miles.

20. The system of claim 10, wherein the pre-determined threshold distance value comprises: 1 mile, 2 miles, or 3 miles.

* * * * *